United States Patent [19]

Liu

[11] Patent Number: 5,232,538

[45] Date of Patent: Aug. 3, 1993

[54] LAMINATING MACHINE FOR PAPER PROTECTION

[75] Inventor: Hwa-Chen Liu, Taipei, Taiwan

[73] Assignee: Age Technology Co., Ltd., Taipei, Taiwan

[21] Appl. No.: 715,354

[22] Filed: Jun. 14, 1991

[51] Int. Cl.$^5$ .................. B30B 15/34; B32B 31/20
[52] U.S. Cl. .................. 156/359; 156/498; 156/499; 156/555; 156/583.1; 219/469; 100/93 RP; 100/155 R
[58] Field of Search .................. 156/359, 555, 583.1, 156/498, 499; 219/469; 100/155 R, 93 RP

[56] References Cited

U.S. PATENT DOCUMENTS

| | | | |
|---|---|---|---|
| 3,027,285 | 3/1962 | Eisner et al. | 156/359 |
| 3,367,225 | 2/1968 | Stanford et al. | 156/499 X |
| 3,453,169 | 7/1969 | Buck et al. | 156/555 X |
| 3,840,420 | 10/1974 | Sarcia | 156/359 X |
| 3,901,758 | 8/1975 | Humphries | 156/499 |
| 4,416,719 | 11/1983 | Horiuchi | 156/359 |
| 4,565,956 | 1/1986 | Zimmermann et al. | 318/721 |
| 5,073,076 | 12/1991 | Parkhill et al. | 156/555 X |

Primary Examiner—David A. Simmons
Assistant Examiner—J. Sells
Attorney, Agent, or Firm—McGlew and Tuttle

[57] ABSTRACT

A laminating machine for paper protection, particularly a laminating machine with a motor and a transmission device located within a casing composed of an upper casing member and a lower casing member, a pair of rollers rotating in opposite direction; having a heating element, a thermal sensor, a heat distribution plate and a heater base to melt plastic film and adhere it to paper or card; and incorporated with a pair of back to back cooling plates to cool down the laminated paper or card.

3 Claims, 1 Drawing Sheet

LAMINATING MACHINE FOR PAPER PROTECTION

BACKGROUND OF THE INVENTION

Papers and cards, especially important documents, may need some forms of protection, among different methods the laminating with a plastic film is the most popular and advanced way.

The Laminating referred to here means covering of a layer of plastic film on surface of paper or card. A waterproof and airtight plastic film can protect the paper or card from moisture, and prevent from damage to the paper or card.

Conventionally the laminating machine for such an application is of electronic type or mechanical type, and has the following defects:

(1) The cost of electronic type laminating machine is high, breakdown of any electronic component will make the whole laminating machine not function, trouble-shooting is not easy, and its service life is short.

(2) Mechanical laminating machines usually work at extra high temperature, which result in formation of defect upon laminating, particularly in the laminating of a photograph.

(3) The conventional laminating machine has to transform alternating current to direct current to drive, a d.c. motor, speed of which is reduced by an exposed gear train from about 10,000 r.p.m. to 10 r.p.m, hence there is a large noise, and deviation in fitting of components will result in a poor laminating effect.

(4) Temperature control is not easy, particularly while cards of different hardness are laminated.

(5) Poor cooling effect because of cooling on only one side in a small cooling distance, results in residual heat after laminating.

In view of the above defects, the inventor has created a new structure of laminating machine with his years of experiences in production and distribution of laminating machines.

SUMMARY OF THE INVENTION

The main objective of the present invention is to provide a laminating machine for paper protection, particularly a laminating machine with a motor and a transmission device located within a casing composed of an upper casing member and a lower casing member, a pair of rollers rotating in opposite direction; having a heating element, a thermal sensor, a heat distribution plate and a heater base to melt plastic film and adhere it to paper or a card; and incorporated with a pair of back to back cooling plates to cool down the laminated paper or card.

DETAILED DESCRIPTION OF THE PREFERRED EMBODIMENTS

Figure 1:
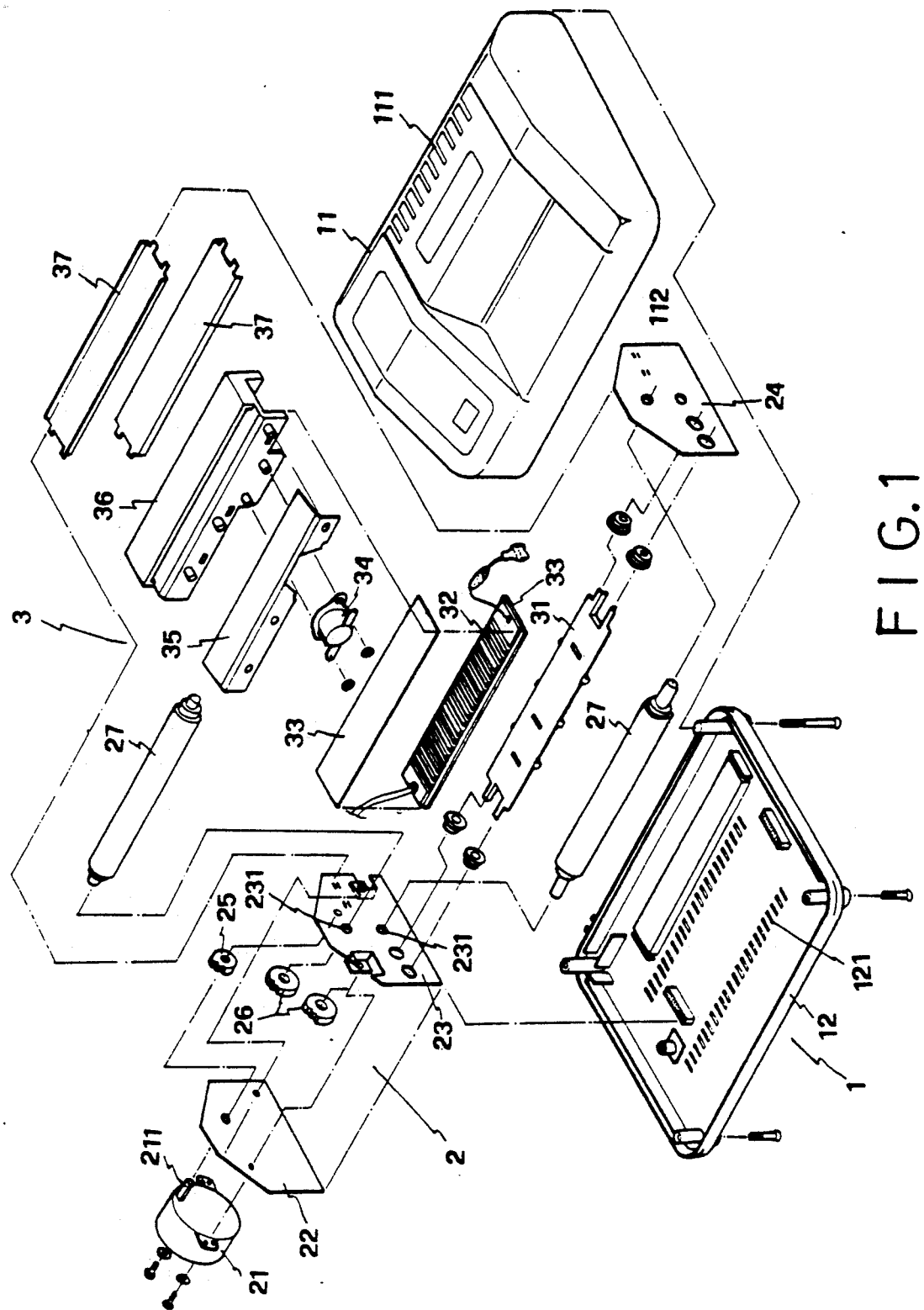
FIG. 1 is a fragmental perspective view of a preferred embodiment according to the present invention.

The structure, features and elements of the preferred embodiment according to the present invention is described below with reference to the attached drawing.

As shown in FIG. 1, the present invention comprises mainly a casing (1), a transmission device (2), and a temperature controller (3).

The casing (1) is mainly composed of an upper casing member (11) and a lower casing member (12) which are fixed together, each of which has a plurality of holes, upper heat dissipation holes (111) at the upper casing member (11) and lower heat dissipation holes (121) at the lower casing member (12) for cooling purpose. A gap (112) is designed at the front side of the upper casing member (11) for feeding in of paper or card.

The transmission device (2) is composed of a motor (21), a left plate member (22), a right plate member (23), a side plate member (24), a driving gear (25), two driven gears (26) and two rollers (27).

As shown in the drawing, the motor (21) is a reversible synchronous motor placed between the left plate member (22) and the right plate member (23), and has its output shaft (211) coupled to the driving gear (25) engaging with two driven gears (26) for rotation in the same direction. The right plate member (23) has two round holes (231) for holding the rollers (27), each of such rollers (27) has a shaft connected with the central hole of a driven gear (26) so that these two rollers are rotating in opposite directions during operation of the present invention.

The temperature controller (3) is located in a space formed by the upper casing member (11), lower casing member (12), the right plate member (23) and a side plate member (24). It comprises mainly a push plate (31), a heating element (32), two insulating plates (33), a thermal sensor (34), a heat distribution plate (35), a heater base (36), and two cooling plates (37).

An end of the push plate (31) is fixed at the right plate member (23), and another end of the push plate (31) is fixed at the side plate member (24). The heating element (32) is an electric heating element (nickel-chrome alloy) or other heating material with an insulating plate (33) at the bottom so that heat can be conducted to the heater base (36). An insulating plate (33) is placed below the top of the heater base (36). The heat distribution plate (35) is placed between the heater base (36) and the heating element (32). The heat distribution plate (35) is in the form of a thin plate having a thickness of less than 1 mm, and is placed within the heater base (36) in a way that an air gap is formed between it and the heater base (36) to moderate heat radiation. The thermal sensor (34) is located in a space below the heat distribution plate (35) Two cooling plates (37) arranged back to back are placed at the back, and fixed to the right plate member (23) and the side plate (34) respectively.

After assembly of the preferred embodiment according to the present invention, and after it is turned on, the heating element (32) begins to generate heat to a preset temperature. Before any paper or card is fed for laminating, heat energy is accumulated at the heat distribution plate (35). When paper or a card is fed into the machine though the gap at the upper casing element (11), the plastic film on the surface of the paper or card is melted, and adhered to the paper or card evenly when the paper or card is brought forward by the rollers (27). The radiant heat in the heater base (36) serves as an supplemental heat in case heat energy is not sufficient. The thermal sensor (34) is used to monitor temperature, and consequently turns on or off the heating element when the temperature is lower or higher than the preset lower or upper limit to avoid poor laminating quality due to insufficient heating or overheating. Rolling by the rollers (27) can expel gas generated during the adhesion process, and keep the plastic film to adhere to the paper or card closely and evenly. The paper or card so laminated is then led to pass through the cooling plates (37) for fast cooling purpose.

According to the preferred structure of the invention, a reversible motor is provided. Such a reversible motor has been found to be extremely desirable in preventing problems with a laminating device. In particular, in the case of a paper jam, such a reversible motor can be used to run in a reverse direction, thereby forcing the item (paper or card) to proceed in a reverse direction (retreat) and thereby prevent any further trouble, including jamming. In the case of an overload, paper can be again pushed in a reverse direction. This feature is particularly important as originals which are to be laminated can often be lost by such jamming and by reversing the direction, such originals can often be saved from destruction.

In comparison with the prior art, the present invention has the following advantages:

(1) Stable and noiseless transmission: The a.c. synchronous motor is running at some hundreds r.p.m., but its output shaft is reduced to less than 10 r.p.m. by incorporation with a reducer to make it running stably and silently with minimum possibility of trouble. Therefore, the output shaft is running at a fixed speed, and will not be affected by a change of load. Its operation is quite and stable, and possibility of trouble is low. This design eliminates the use of expensive voltage regulation circuit as required in the prior act (2) Uniform melting temperature by design of the heat distribution plate: In the prior art, the feeding of paper or card is not carried out through rollers gradually, and hence there is no sufficient time at the initial stage to melt glue of the plastic film at the front end. The present invention has a heat distribution plate to accumulate heat energy for prompt transfer to the plastic film, and has a heating base to provide supplemental heat energy to melt glue of the plastic film. The heat distribution plate also serves as a buffer in case of overheating to maintain high quality laminating.

(3) Fast cooling by design of two cooling plates: The upper cooling plate is flexibly installed for passing through paper or a card of different thickness, and both the upper and lower cooling plates keep complete contact with the surface of the paper or card passing through to prevent it from curling or corrugation of the paper or the card as occurred in the prior art due to insufficient cooling.

Having described only the typical preferred form and application of the present invention, the inventor does not wish to be limited or restricted to the specific details herein set forth, but wish to reserve to himself any modifications or variations that may appear to those skilled in the art, as set forth within the limits of the claims below.

I claim:

1. A laminating machine for paper and card protection comprising a casing composed of an upper casing member and a lower casing member which are fixed together, each of which has a plurality of upper heat dissipation holes or lower heat dissipation holes, with a gap at the front side of the upper casing member for feeding in of paper or a card;

a transmission device composed of a motor, a left plate member, a right plate member, a side plate member, a driving gear, two driven gears and two rollers, in which the motor is a reversible synchronous motor placed between the left plate member and the right plate member, and has its output shaft coupled to the driving gear engaging with two driven gears for rotation in the same direction, which consequently coupled to two rollers having their respective other ends fixed to the side plate member so that these two rollers are rotating in opposite directions during operation of the present invention; and temperature controller means located in a space formed by the upper casing member, the lower casing member, the right plate member and a side plate member, for generating a temperature within a desired range for heating plastic film to a melting point and for evenly distributing said heat at said temperature in a region upstream of said rollers and for cooling a laminated structure, downstream of said rollers, said temperature controlling means including a heating unit, upstream of said rollers with a push plate fixed to said right plate member at one end and being fixed to said side plate member at another end, and a heating element supported by said push plate, said heating element being surrounded by a first insulating plate and a second insulating plate for restricting heat transfer out of said heating element, a heater base connected to said heating element above said second insulating plate, a heat distribution plate connected to said heater base provided as an overlap structure with an air gap being provided between said heater base and said heat distribution plate to moderate heat radiation, a thermal sensor connected to said heater base for monitoring said temperature, a first cooling plate and a second cooling plate positioned downstream of said rollers, said first cooling plate and said second cooling plate defining a passage through which an article passes after being heated upstream of said roller, for cooling said article prior to said article passing out of the machine said heat distribution plate being positioned adjacent an inlet for the even distribution of heat at said temperature to the article passing into the machine.

2. A laminating machine for paper and card protection as claimed in claim 1 wherein the motor is a low speed synchronous motor.

3. A laminating machine for paper and card protection as claimed in claim 1 wherein the heat distribution plate is in the form of a thin plate having a thickness of less than 1 mm, placed within the heater base.

* * * * *